Dec. 6, 1927.

J. M. LUCARELLE 1,652,029

CONTROL MECHANISM

Filed Nov. 21, 1924

INVENTOR
JOSEPH M. LUCARELLE
BY
ATTORNEY

Patented Dec. 6, 1927.

1,652,029

UNITED STATES PATENT OFFICE.

JOSEPH M. LUCARELLE, OF BRIDGEPORT, CONNECTICUT, ASSIGNOR TO DICTAPHONE CORPORATION, OF BRIDGEPORT, CONNECTICUT, A CORPORATION OF NEW YORK.

CONTROL MECHANISM.

Application filed November 21, 1924. Serial No. 751,415.

This invention relates to controlling devices, and more particularly, controlling devices actuated by an operator for the purpose of controlling at a distance the operation of parts of machines.

The specific form of device shown is adapted to be actuated by the foot of an operator to produce fluid pressure through a conducting tube to the associated parts of a machine which it is intended to operate.

An object of this invention is to provide a device of the character specified which may be operated by a tilting movement or a rectilinear movement of the operating part, according to the convenience of the operator at the particular time when the operation is performed.

Other objects and advantages will hereinafter appear.

Figure 1:
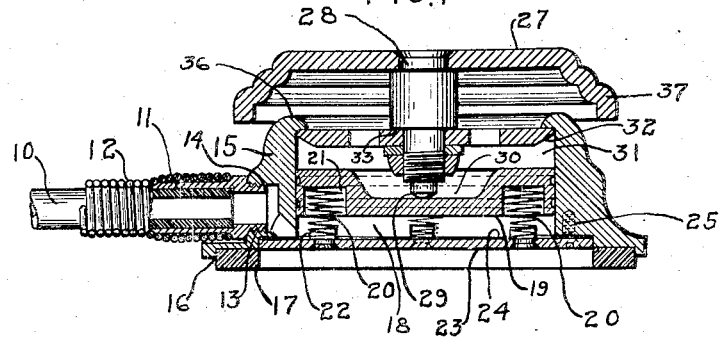
Figure 1 is a sectional view showing the parts of the device in their normal, idle positions.

The particular device shown in the accompanying drawing is adapted to control mechanism by means of air pressure, transmitted through a conveying tube 10 which may be of rubber or metal according to whether a permanent or fixed connection is desired. The tube 10 is adapted to be inserted in a nozzle 11 and when made of rubber, is provided with a protecting sheath of coiled wire 12 at its point of connection to the nozzle 11. The nozzle 11 is provided with screw-threads 13 adapted to be inserted in a screw-threaded opening 14, provided in the base 15 of the device.

The base 15 is preferably provided with an annular pocket 16 having set therein, a ring or disk of rubber 17 which spaces the base from the floor to both prevent the marring of the floor and to hold the device against slipping or skidding thereover.

The base 15 is provided with a cylindrical chamber 18 in which there is slidably mounted for vertical movement, a piston 19 which is held in normal elevated position, shown in Fig. 1, by means of coiled springs 20 having their upper ends located in recesses 21 provided in the piston, and their lower ends supported on studs 22 fixed to a plate 23 which is also adapted to close the bottom of the cylindrical chamber 18. An air-tight connection is provided between the plate 23 and the base 15 by a gasket 24 located between the plate and base, and the plate is held to the base by screws 25 threaded therein.

When the piston 19 is moved downwardly in the chamber 18 the air between the piston and plate is forced out of the chamber through an opening 26 communicating with the nozzle 11 of the pipe 10 and the pressure so produced is caused to operate some part of a machine or apparatus associated with the control device. Likewise the rising movement of the piston draws in air through the tube 10, nozzle 11 and opening 26, and this action may restore previously operated parts or initially operate other parts, as desired.

The piston 19 is depressed against the tension of springs 20 to force the air from the chamber 18 by a foot-piece or pedal 27 having riveted or otherwise secured thereto, a stud 28 whose end 29, in order to decrease as much as possible the height of the device, is located in a depression 30 in the top surface of the piston 19. The pedal 27 is guided for movement in the base 15 in the portion 31 of the chamber 18 by means of a disk 32 mounted on the stud 28 and held in engagement with a shoulder 33 by a washer 34 and nut 35 threaded on the stud 28 adjacent the end 29. The disk 32 is provided with perforations so that its movement will not be retarded by the air confined in the portion 31.

In its normal position, the foot-piece 27, because of the engagement of the end 29 with the spring-pressed piston 19 is held to its uppermost position, shown in Fig. 1, with the periphery of the disk 32 in engagement with a flange 36 on the base 15. An overhanging flange 37 on the foot piece 27 conceals the opening in the base 15 in all positions of the parts.

When the foot piece 27 is operated by a vertical movement perpendicular to the bottom of the base 15, the disk 32 moves parallel with the piston 19 forcing the piston downwardly until it strikes against the bottom plate 22, at which time practically all of the air in the chamber 18 is exhausted.

Figure 2:
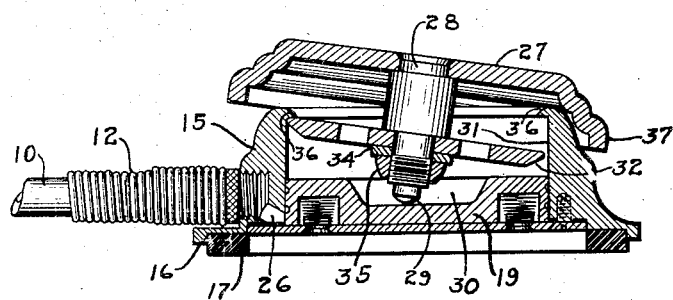
Fig. 2 is a view similar to Fig. 1, but showing the operating part in one of the positions it may assume when operated.
Figure 3:
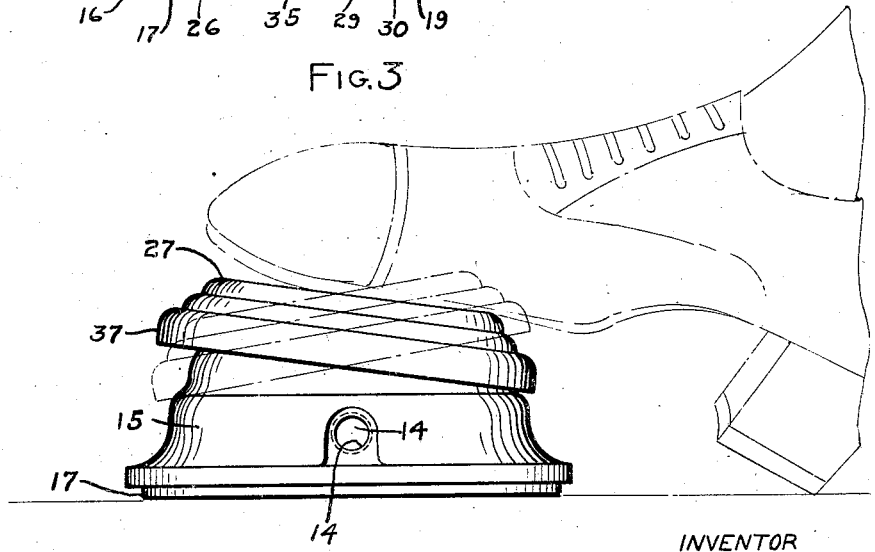
Fig. 3 is an elevation of the device shown in Figs. 1 and 2, showing the manner in which the operator's foot may actuate the device.

It is seldom, however, that the foot-piece is so operated because usually the operator's heel rests upon the floor, as shown in Fig. 3, with the ball of the foot resting upon the foot-piece 27. When the foot is in this position, its downward movement tends to move the foot-piece by a rocking movement, as shown. When this occurs, a portion of the periphery of the disk 32 engages the flange 36 on the base 15 and acts as a fulcrum for the foot-piece 27 so that as it tilts the end 29 moves outwardly and downwardly upon the bottom of the recess 30 to the position shown in Fig. 2, with the piston engaging the bottom plate 23.

Since the disk 32 is circular and the flange 36 extends completely around the base, the foot-piece 27 may be tilted from any angle with the same effect. This is a particularly advantageous feature, since it allows the operator to depress the foot-piece without first having to position it in any particular predetermined position. Another advantage in having this floating arrangement of the foot-piece is that the piston will properly be operated by any movement which is sufficient in extent to cause the piston to strike the bottom plate 23, irrespective of the direction of such movement.

It should be remembered that devices of this kind are usually placed under a desk or in a position where they can be reached by the foot and are usually out of sight, and therefore, any improvement which makes it unnececsary for the operator to operate the device in a certain way has a decided advantage.

Variations and modifications may be made within the scope of my invention, and portions of the improvements may be used without others.

What is claimed as new and for which it is desired to obtain Letters Patent, is:

1. A portable control device comprising a base having floor-engaging means; means movable vertically in the base; and a foot-piece loosely connected with the last named means adapted to operate the same by either a rectilinear or tilting movement, said foot-piece being substantially as large as the base and being operated by a rectilinear or tilting movement according to the way the operator's foot happens to engage it.

2. A control device comprising a base having a cylindrical air chamber; a piston movable in the base to exhaust the air contained in the cylindrical chamber; and means for operating said piston comprising a device adapted to be moved either in a straight line or by a tilting arcuate movement.

3. A control device comprisnig a base having a cylindrical air chamber; a piston movable in the base to exhaust the air from said chamber; and a floating foot-piece adapted to actuate said piston by a tilting movement.

4. A portable pneumatic control device comprising a housing adapted to be placed on the floor; a piston movable within the housing; and a floating foot-piece adapted to engage the piston, said floating foot-piece being operable irrespective of the position of the operator's foot, angularly with respect of the housing.

5. A control device comprising a housing having a cylindrical chamber; an outlet for said chamber; a piston movable vertically in said chamber; a pedal engaging said piston and having a foot-piece located at right angles to the axis of the piston; pivotal means for guiding the pedal in arcuate movement; said pivotal means allowing said foot-piece to be moved rectilinearly toward and from the base.

6. A control device comprising a housing; a cylindrical air chamber in the housing; an outlet orifice in the chamber; a piston movable in said chamber; a pedal for operating said piston comprising a shank adapted to engage the piston and a head having an overlying flange adapted to surround the housing.

7. A foot control device comprising in combination a housing; a cylindrical air chamber in the housing; an outlet orifice in the chamber; a piston movable in said chamber; a pedal for operating said piston comprising a shank adapted to engage the piston; a head having an overlying flange adapted to surround the housing; a circumferential flange at the upper portion of the housing; and a disk on said shank adapted to engage said flange.

Signed at Bridgeport, in the county of Fairfield, and State of Connecticut, this 18th day of November, 1924.

JOSEPH M. LUCARELLE.